United States Patent
Galloway

(10) Patent No.: US 6,563,595 B1
(45) Date of Patent: May 13, 2003

(54) METHOD OF COMMUNICATING WITH A SCSI BUS DEVICE THAT DOES NOT HAVE AN ASSIGNED SCSI ADDRESS

(75) Inventor: William C. Galloway, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 07/955,669

(22) Filed: Oct. 2, 1992

(51) Int. Cl.$^7$ ................................................ G06K 15/00
(52) U.S. Cl. .............................. 358/1.1; 710/1; 710/100
(58) Field of Search ................................. 395/112, 114, 395/164, 166, 275, 325, 821, 823, 826, 280, 828, 853, 856, 857, 306, 425, 725; 358/442, 444

(56) References Cited

U.S. PATENT DOCUMENTS 4,849,931 A * 7/1989 Ishii et al. .................. 395/823
5,367,647 A * 11/1994 Coulson et al. ............. 710/105

* cited by examiner

Primary Examiner—Gabriel Garcia
(74) Attorney, Agent, or Firm—Akin, Gump, Strauss, Hauer & Feld, LLP

(57) ABSTRACT

A SCSI device resides and communicates on the SCSI bus without that device being assigned a SCSI address or corresponding SCSI ID. The driver software on the host computer directs the SCSI initiator device to select itself as its target, so the initiator then only asserts one bit of the eight bit SCSI data bus. The SCSI device determines when a SELECTION phase is under way and then determines if only one bit has been asserted on the SCSI data bus. The SCSI device then responds to the initiator as being the target device, thus completing the SELECTION phase. The initiator and the SCSI device can then communicate as a normal initiator and target would during information transfer stages of the SCSI standard. This is all done without the SCSI device occupying a normal SCSI address.

11 Claims, 14 Drawing Sheets

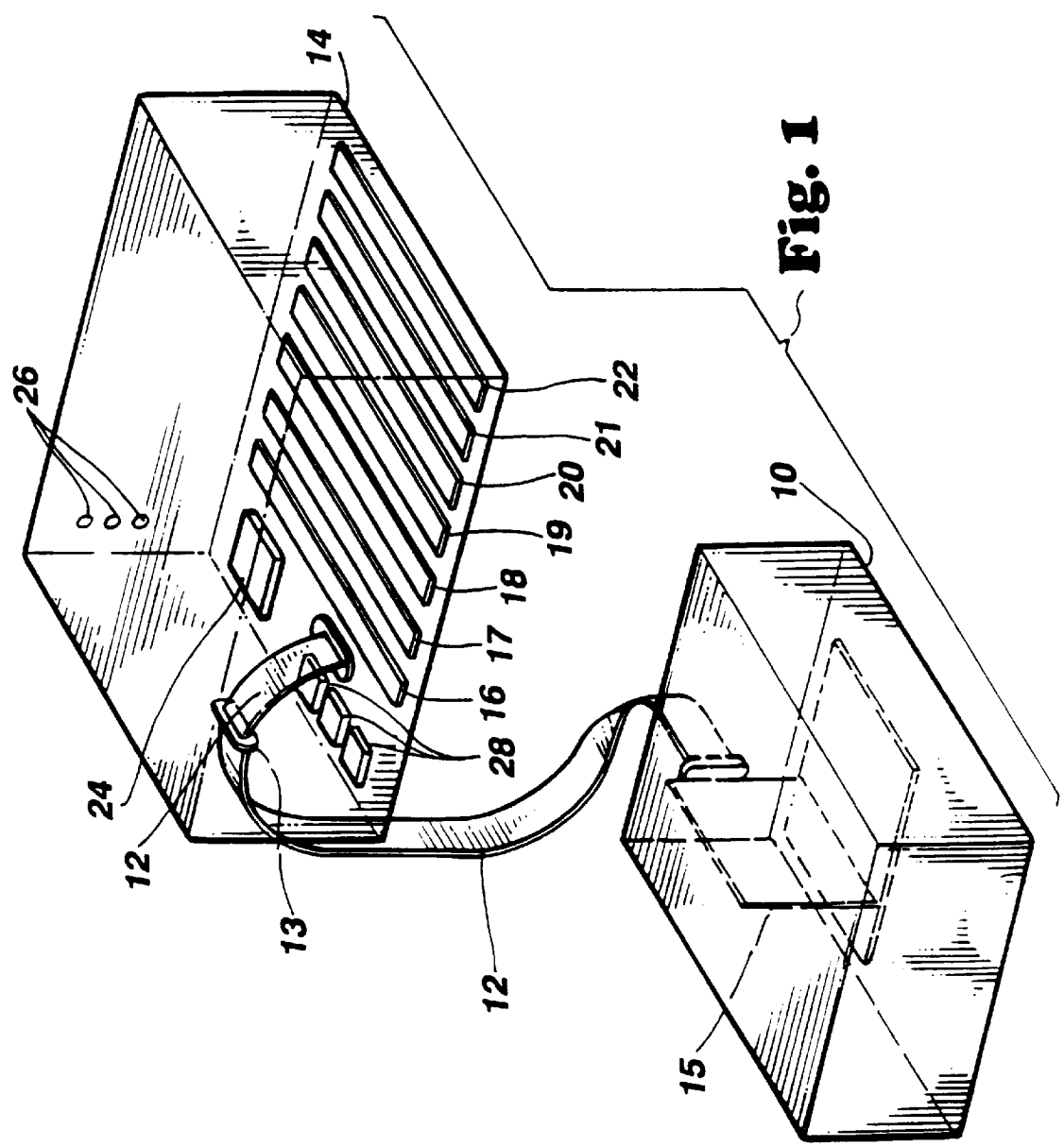

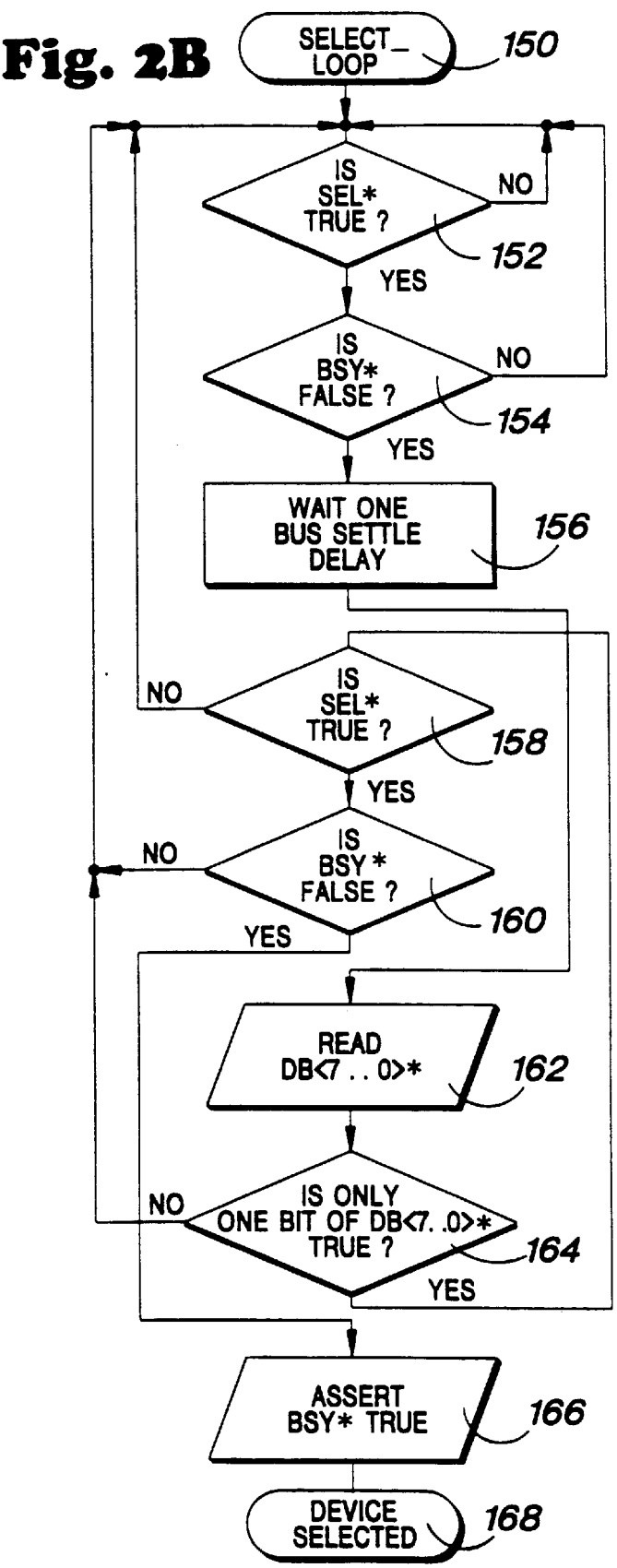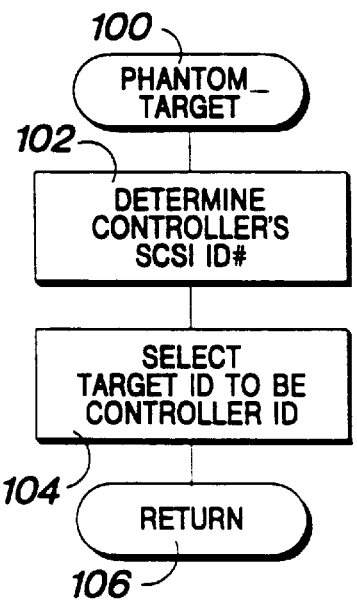
Fig. 2B
Fig. 2A

METHOD OF COMMUNICATING WITH A SCSI BUS DEVICE THAT DOES NOT HAVE AN ASSIGNED SCSI ADDRESS

BACKGROUND OF THE INVENTION

1. Field of the Invention

The invention relates to communicating with devices on digital computer system buses, and more particularly, to a method of and circuitry for selecting a device on a SCSI bus without that device having an assigned SCSI address.

2. Description of the Related Art

Digital computer systems are becoming more powerful, flexible, and distributed with each passing day. These advances are due to many factors, including improvements in software capabilities, in computer system architectures, and in semiconductor devices such as microprocessor and memory chips.

One architecture that has often improved the flexibility and performance of small systems is the Small Computer System Interface (SCSI) standard. The SCSI standard is a specification developed by the American National Standards Institute (ANSI) defining mechanical, electrical, and functional requirements for attaching small computers to each other and to intelligent peripherals such as hard disks, flexible disks, magnetic tape drives, printers, optical disks, and scanners. The current issued specification is SCSI-2, with SCSI-3 under development. The SCSI-2 specification, either the final or most recently published draft, is incorporated into this document by reference.

One advantage of SCSI is that numerous devices can be connected on a single bus and accessed through a single controller, with only software device drivers varying between the devices. This facilitates the connection of new devices to the bus. By allowing the combination of a variety of devices on a single standardized bus, SCSI provides a very flexible system. A second advantage of SCSI is its high performance. A system implementing SCSI can quickly and efficiently communicate with very high density storage devices.

Because of SCSI's high performance capabilities and its expanding popularity, chip designers have developed specialized integrated circuits to implement many parts of the SCSI standard. Some of these chips handle many of the low level complexities of interfacing the physical portion of the SCSI standard, which is the physical connection between the controller and the various devices. One example of such a chip is the 53C710 SCSI I/O Processor from NCR Corporation (NCR) of Dayton, Ohio. This device would typically be implemented on a circuit board for use as a SCSI controller card. Such a controller card typically would physically run on a host computer system bus, such as the EISA bus, and would also provide the physical connectors for connecting to the SCSI bus. The controller chip would then interface between the host system bus and the SCSI bus.

One problem with the SCSI standard is that it only provides for eight SCSI addresses (0–7). This can be a limitation in systems that require a large amount of mass storage or require a variety of SCSI devices, as every additional SCSI address remaining available can become important. The number of SCSI addresses available is not readily expandable because of the non-multiplexed way in which devices are identified. During the selection phase of the SCSI communication cycle, a device is identified by the SCSI ID that corresponds to its SCSI address. This is done by asserting one of eight lines on the SCSI data bus DB<7 . . . 0>*. As there are only eight lines for addressing on the SCSI bus, that limits a device's SCSI ID to one of those eight lines. Thus, the SCSI bus only provides for eight SCSI devices, with the controller always being one device.

The SCSI communications architecture includes eight distinct phases: a BUS FREE phase, an ARBITRATION phase, a SELECTION phase, a RESELECTION phase, a COMMAND phase, a DATA phase, a STATUS phase, and a MESSAGE phase. Of importance is the SELECTION phase, which allows an initiator, which has won the previous arbitration phase and which is generally a SCSI controller device, to select a target device for initiating some target function (e.g., a READ or WRITE command). At the start of the SELECTION phase, the SCSI device that won the bus during the previous ARBITRATION phase is asserting the signals BSY* and SEL* true (low), and that device also has delayed at least one bus clear delay plus a bus settle delay before ending the ARBITRATION phase. The initiator then sets the data bus DB<7 . . . 0>* to a value equal to the OR of its SCSI ID bit and the targets SCSI ID bit, and then it asserts the ATN* signal. The initiator then waits at least two deskew delays and then releases the BSY* signal.

At this point, the target determines that it is selected when the SEL* signal and the target's SCSI ID bit are true and the BSY* and I/O* signal are false for at least one bus settle delay. The I/O* signal is used to differentiate between SELECTION and RESELECTION, which is not important here. The selected target then asserts the BSY* signal to complete the selection process. The initiator and the target can then engage in the transfer of information in the CMD, DATA, STATUS and MESSAGE phases.

It would be desirable if a SCSI device could select and communicate on the SCSI bus with another SCSI device that has not been assigned a SCSI address. This would allow communications, for example, with "housekeeping" devices that perform tasks that are too simple to justify the assigning of an individual SCSI address. Further, such a "phantom" SCSI device could also be used for more complex tasks, and could in effect provide an extra SCSI address.

SUMMARY OF THE PRESENT INVENTION

A "phantom" SCSI device built according to the invention, or used according to the method of the invention, resides on the SCSI bus and communicates with a SCSI initiator without that phantom device being assigned a SCSI address (or corresponding SCSI ID). Normally, during the SELECTION phase, a SCSI-2 initiator ORs its own SCSI ID with its target's SCSI ID, thus asserting two bits on the SCSI data bus DB<7 . . . 0>*. According to the invention, however, the driver software on the host computer directs the SCSI initiator device to select itself as its target. The hardware on a SCSI initiator ORs its own SCSI ID with its own SCSI ID, as the initiator is both initiator and target. Thus, the SCSI initiator only asserts one bit of the eight bit SCSI data bus DB<7 . . . 0>*. This does not happen in normal SCSI operation.

A device built according to the invention determines when a SELECTION phase is under way and then determines if only one bit has been asserted on the SCSI data bus DB<7 . . . 0>*. In a normal SCSI-2 operation, two bits on the SCSI data bus would be asserted, so when the device according to the invention detects one data bit, no matter what that data bit is, it knows that it is the target of the SCSI operation. So, no matter what the SCSI ID number of the SCSI controller, when it performs a SELECTION phase with only its own SCSI ID bit set, the phantom SCSI device according to the invention deems that it has been selected. The phantom SCSI device according to the invention then responds to the initiator by asserting the BSY* signal true (low), thus completing the SELECTION phase. The initiator and the phantom SCSI device can then communicate as a normal initiator and target would during information transfer stages of the SCSI standard.

This method of communication can be used according to the invention between a host computer containing a SCSI controller and a SCSI box, or a box designed for special SCSI cards. In such a SCSI box, the phantom SCSI device that is not assigned a SCSI address would be the circuitry that controls the various indicators on the front of the SCSI box and on each special SCSI card. Thus, the SCSI controller board, which is the initiator in communications with the phantom device, can instruct the phantom device to light certain LEDs (light emitting diodes), such as activity LEDs or need service LEDs. Further, the phantom device can inform the SCSI controller what devices are present in the SCSI box, where they are located, and any other information desired by the host computer.

This can all be done without the phantom device occupying a normal SCSI address. This leaves all of the SCSI addresses to be occupied by the eight SCSI IDs available for occupation by either controller boards or other SCSI devices.

BRIEF DESCRIPTION OF THE DRAWINGS

A better understanding of the present invention can be obtained when the following detailed description of the preferred embodiment is considered in conjunction with the following drawings, in which:

FIG. 1 is a perspective view showing a SCSI box connected to a host computer system for operation according to the invention;

FIG. 2A is a flowchart of a routine a host computer would execute to have its SCSI controller establish communications with a phantom SCSI device having no SCSI address according to the invention;

FIG. 2B is a flowchart showing a routine a phantom SCSI device according to the invention would execute to detect when it is being selected;

DETAILED DESCRIPTION OF THE PREFERRED EMBODIMENT

Figure 3A:
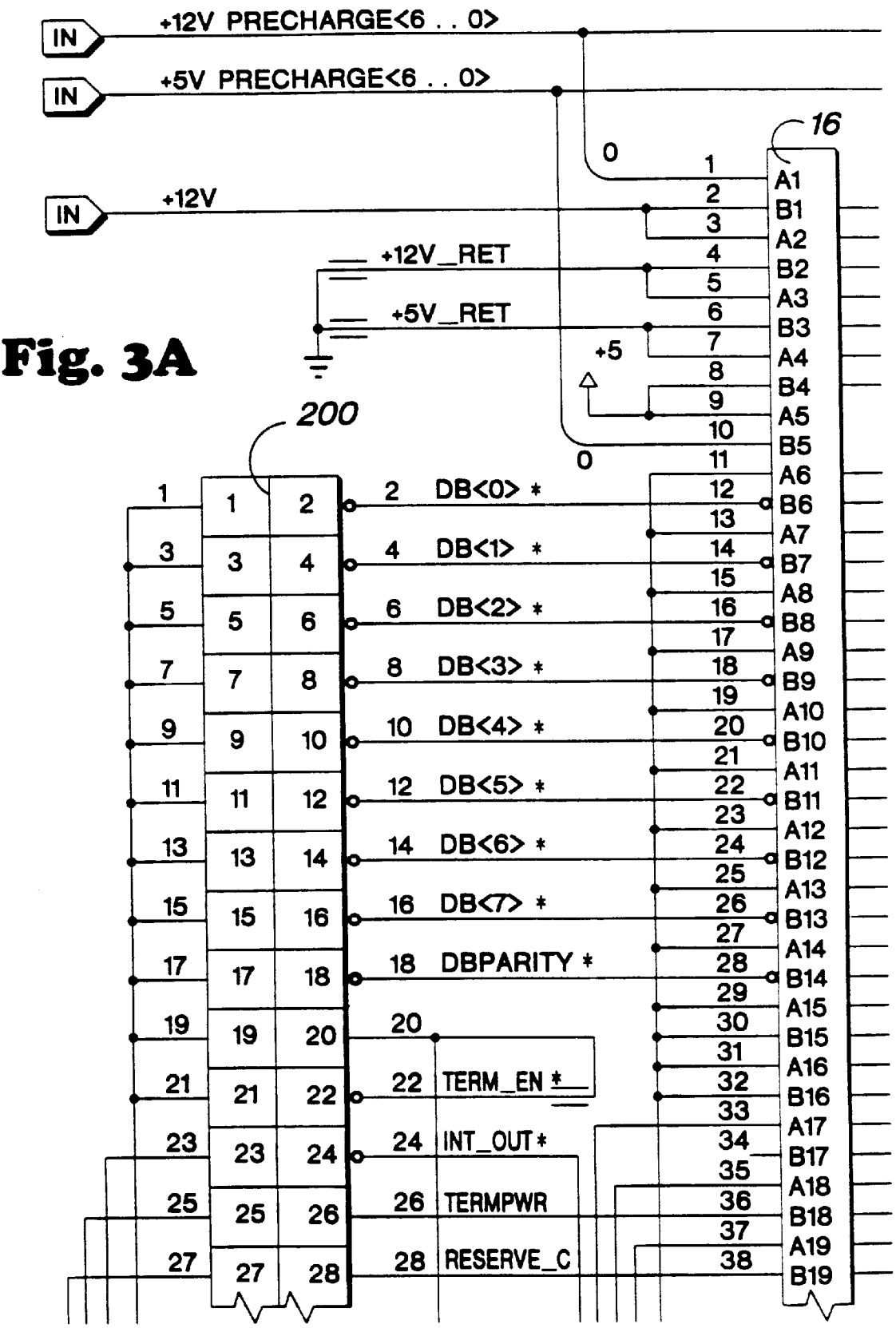
FIGS. 3A–3F are a schematic showing the connections between the SCSI bus port and the backplane connectors in a SCSI box constructed according to the invention.
Figure 3B:
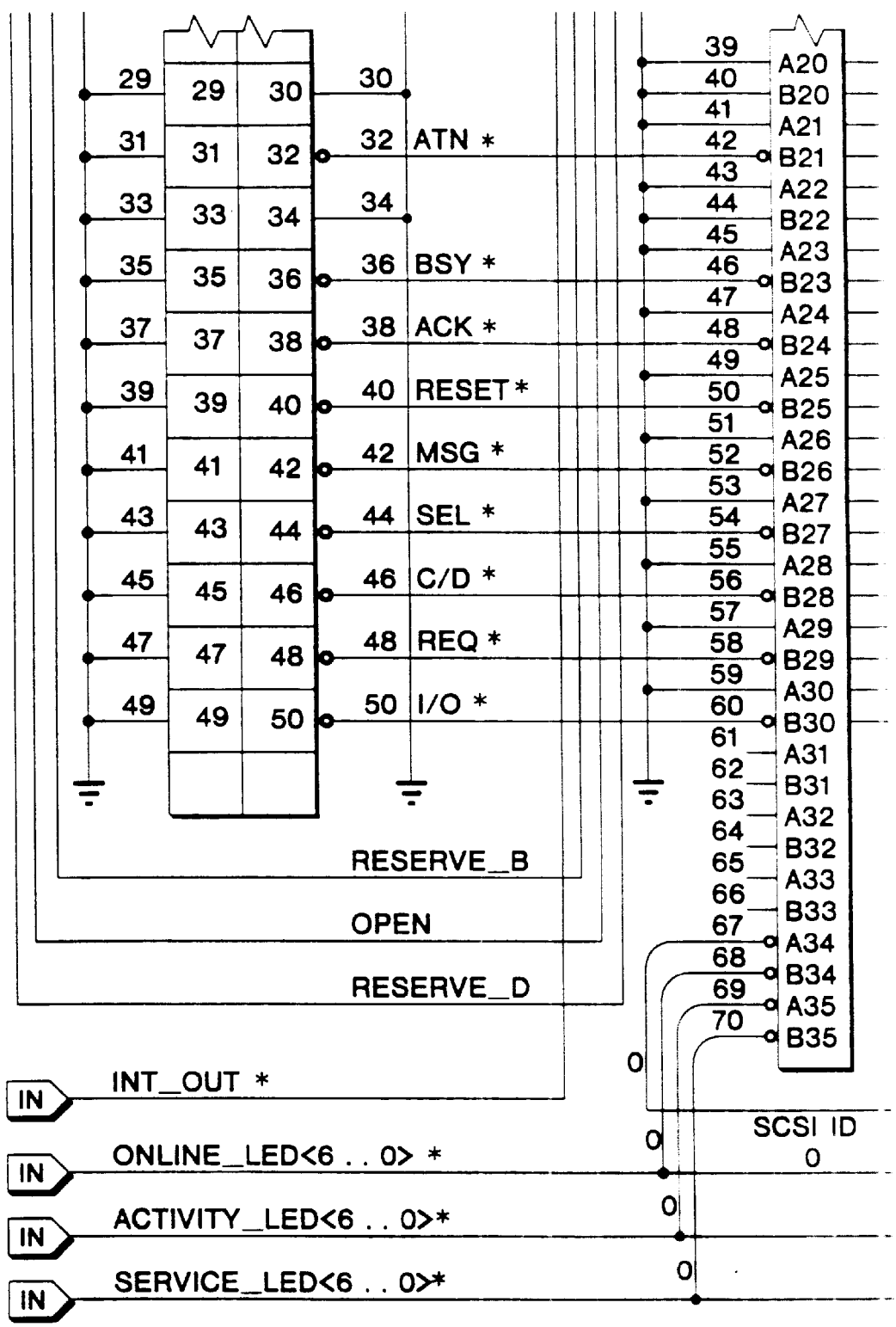
Figure 3C:
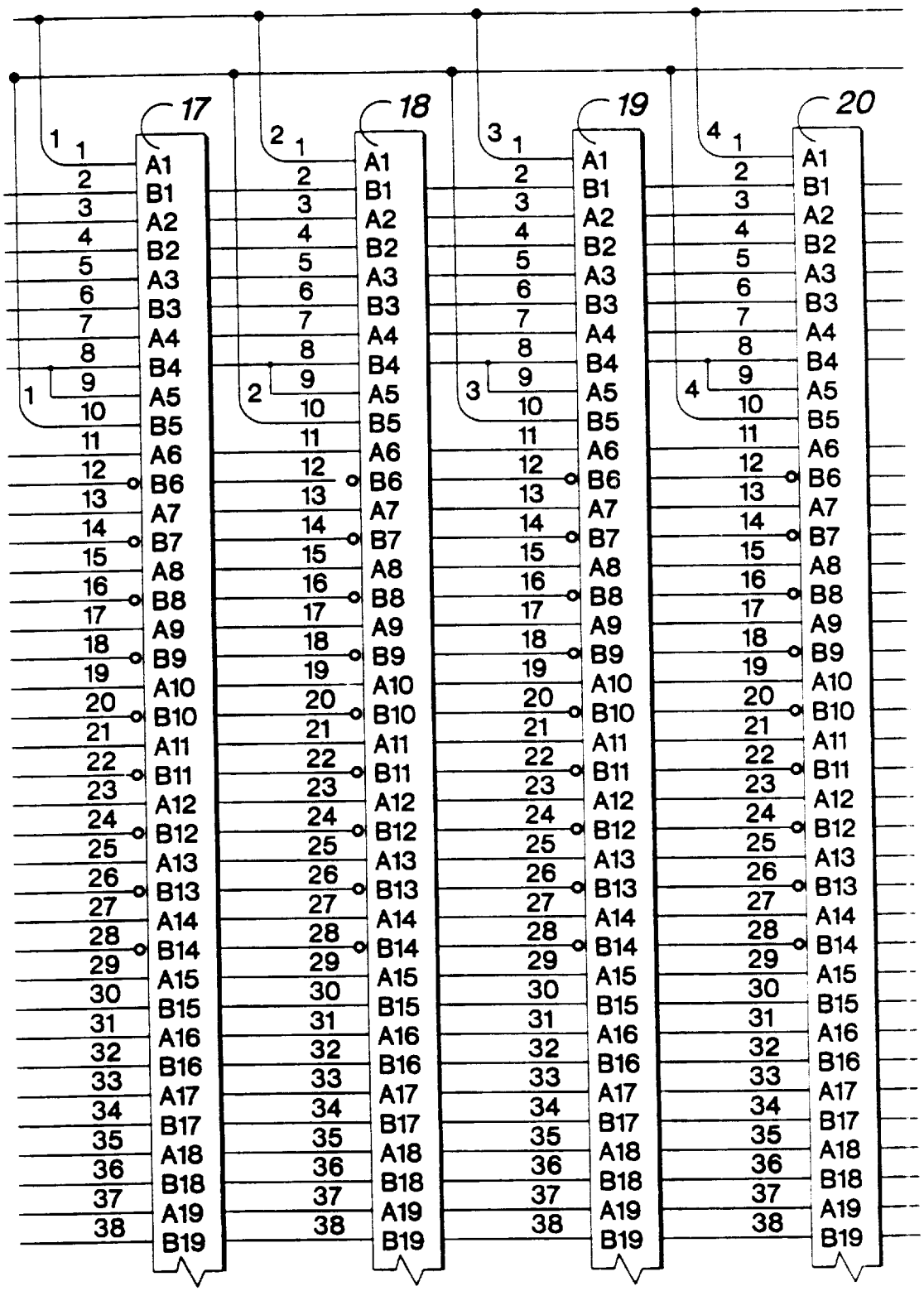
Figure 3D:
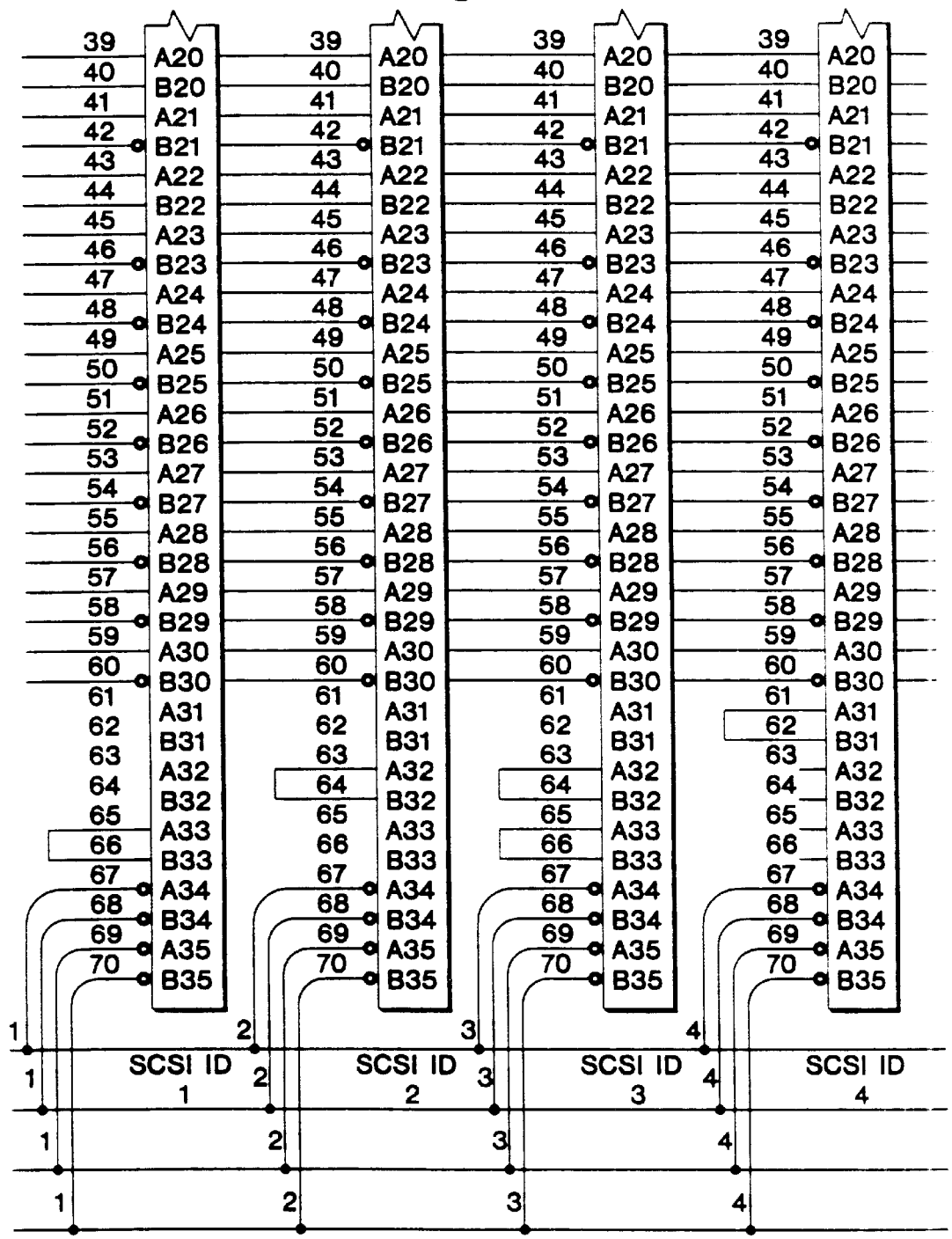
Figure 3E:
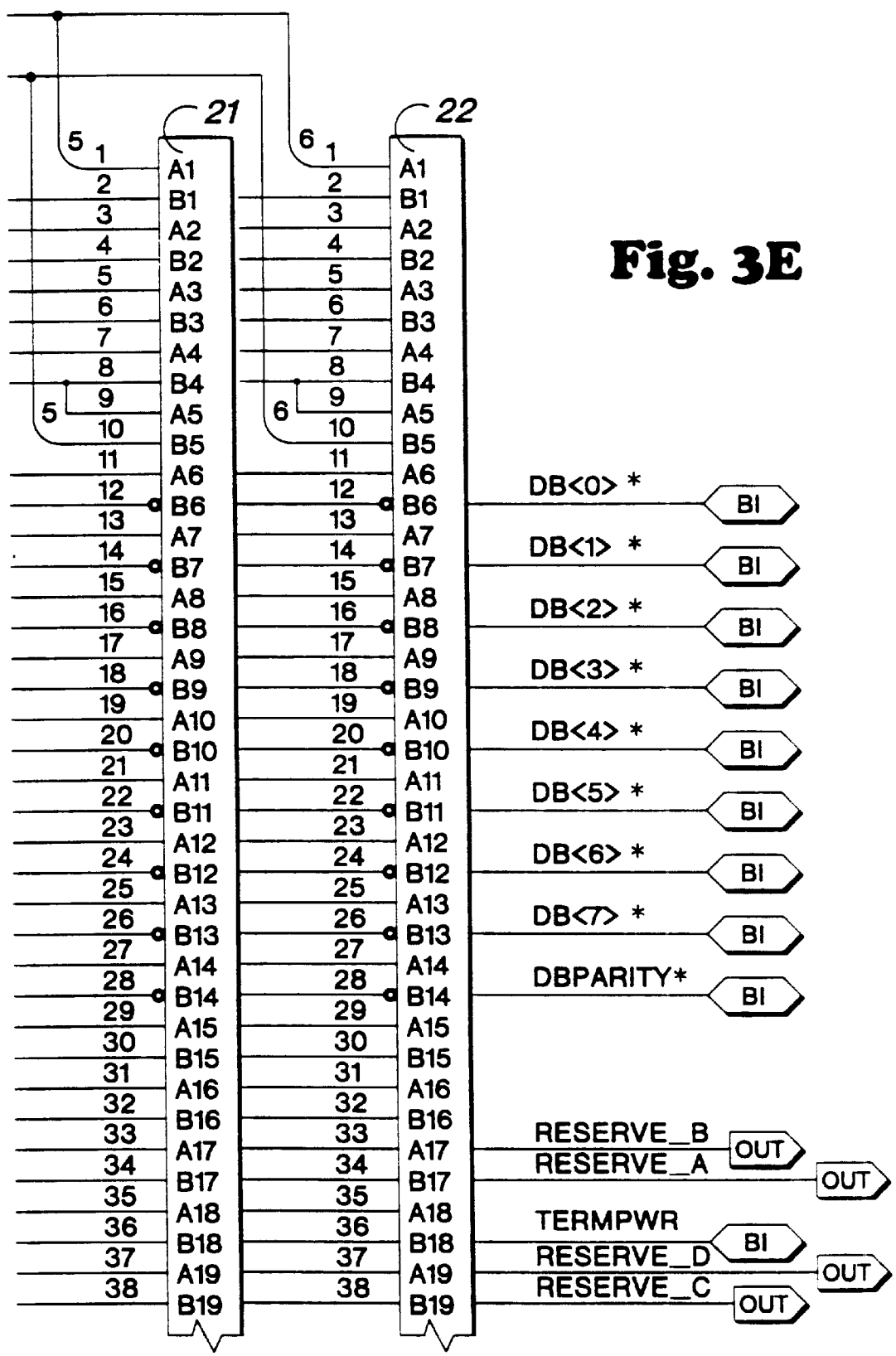
Figure 3F:
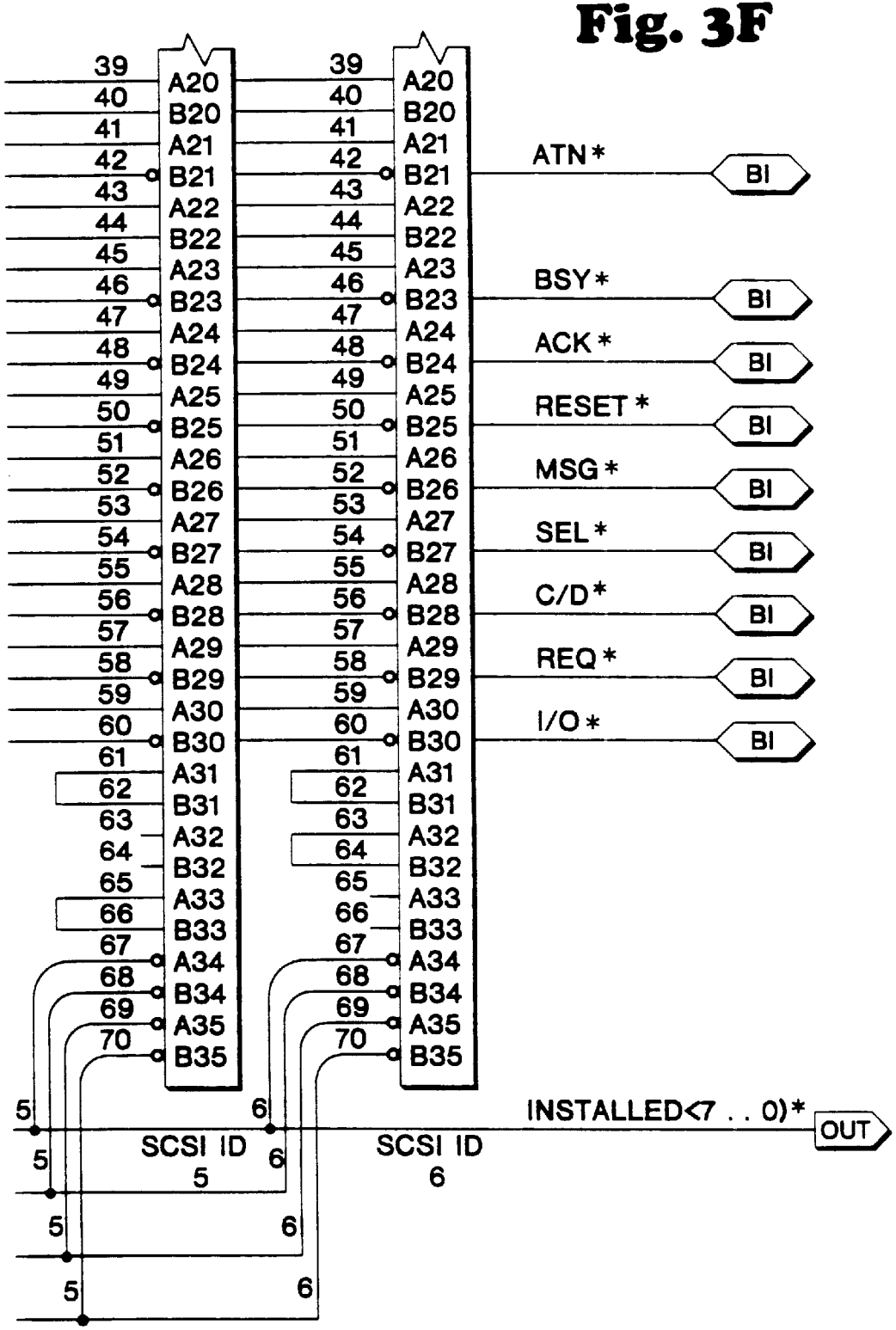

Turning now to the drawings, FIG. 1 shows a host computer system 10 connected via a SCSI cable 12 to a SCSI port 13 on a SCSI box 14. The host computer system 10 contains a SCSI controller 15 that normally acts as the initiator device in the SCSI protocol. The SCSI controller 15 is situated on the system bus, such as an EISA bus, of the host computer 10. Inside the SCSI box 14 is a series of backplane connectors 16, 17, 18, 19, 20, 21, and 22 for mounting SCSI devices. In this embodiment, these devices are contemplated to be miniature hard disk drives insertable into the separate backplane connectors 16–22. Alternatively, more conventional cabling could be utilized between the various SCSI devices mounted in the SCSI box 14. Also inside the SCSI box 14 is an embedded controller 24, which could be of a variety of types of devices, but in this embodiment is an 87C51 embedded microcontroller by Intel Corporation. The embedded controller 24 is connected to and monitors the SCSI bus via the SCSI port 13, as is discussed later. The SCSI box 14 further houses indicator light emitting diodes (LEDs) 26. The indicator LEDs 26 are connected to and driven by the embedded controller 24 via driver circuitry 28, which is discussed later in reference to FIGS. 4A and 6B.

In a device constructed according to the invention, the embedded controller 24 monitors the SCSI bus as transmitted on the SCSI cable 12 for commands from the SCSI controller 15 as controlled by the host computer system 10, and when the embedded controller 24 detects a SCSI SELECTION phase in which only one bit on the SCSI data bus DB<7 . . . 0>* is enabled, which only occurs when the SCSI controller 15 targets itself, the embedded controller 24 responds to the SCSI controller 15 as the target device. Thus, the embedded controller 24 acts as a phantom SCSI device, not requiring an assigned SCSI address.

The SCSI controller 15 and the embedded controller 24 can then communicate as would any normal initiator and target. For example, the host computer system 10 can instruct the embedded controller 24 to set or reset certain of the indicator LEDs 26 or can request the embedded controller 24 to send the status of the various devices connected in the backplane connectors 16–22 using the conventional message, command and data procedures of SCSI.

Targeting the Phantom SCSI Device

FIG. 2A is a flowchart of a routine PHANTOM_TARGET 100 the host computer system 10 executes to select the embedded controller 24 as the target device, even though the embedded controller 24 is assigned no SCSI address or ID, and is thus a phantom SCSI device.

The routine PHANTOM_TARGET 100 is executed the on host computer system 10, which sends commands to the SCSI controller 15 via its system bus. At step 102, the routine determines the SCSI ID number of the SCSI controller 15. This ID usually corresponds to a SCSI address of 0 or 7, but can be any SCSI ID. The host computer system 10 might determine this SCSI ID number in a variety of ways, such as reading an I/O port on the SCSI controller 15.

Once the routine has the SCSI ID number, it simply commands the SCSI controller 15 to set that SCSI ID number as the target ID at step 104 and then commands the SCSI controller 15 to perform a SELECTION phase. This causes the SCSI controller 15 to OR its SCSI ID number with itself, because it is both source and target. Then, during the SELECTION phase, the SCSI controller 15 asserts only one bit on the SCSI data bus DB<7 . . . 0>*. Because the SCSI controller 15 is the initiator device, it knows that it is not the target, and thus does not respond to its enabled SCSI ID bit on the DB<7 . . . 0>*. But more importantly, as the SCSI controller has not enabled any other SCSI ID bit on the SCSI data bus DB<7 . . . 0>*, no other SCSI device will respond as a target. So, the embedded controller 24, or phantom SCSI device, responds instead. That is all that is necessary for the host computer system 10 to select the embedded controller 24, so the routine returns at step 106 and proceeds to the conventional message, command and data operations for SCSI transfers.

Detecting Selection of the Phantom Device

FIG. 2B shows a flowchart of a SELECT_LOOP routine 150 that the embedded controller 24 in the SCSI box 14 executes to determine when it has been selected as the target SCSI device. The signals needed by the SELECT_LOOP routine 150 are standard SCSI signals, and later figures will illustrate that these signals are in fact provided to the embedded controller 24.

At step 152, the routine determines if the SCSI bus signal SEL* is true. As SEL* is an active low signal, true means it is driven low on the SCSI bus. An initiator drives this signal true at the start of a SELECTION phase, so if it is not true, then a SELECTION phase has not begun, and the routine loops to the beginning of the loop and again executes step 152.

If the SEL* signal is true, then the routine determines if the SCSI signal BSY* is false at step 154. As this is also an active low signal, it is false if it is high. If not false, then another SCSI device has responded to the initiator's selection request, so the embedded controller 24, or phantom device, executing this routine according to the invention has not been selected. In that case, the routine again returns to the beginning of the loop, step 152.

If the BSY* signal is false, then an initiator has initiated a SELECTION phase and a target has not yet responded, so at step 156 the routine waits one bus settle delay. This delay is defined by the SCSI specification to be 400 ns. As the embedded controller 24 will generally not be a very fast device, this step is not absolutely necessary, but should still be performed to ensure that the embedded controller 24 has not read the SEL* signal or the BSY* signal while they were not stable.

After this delay, the routine then reads the SCSI data bus DB<7 . . . 0>* at step 162. At step 164, the routine determines if only 1 bit of the SCSI data bus DB<7 . . . 0>* was set by the initiator. If 2 bits were set, then this is a normal SCSI communication, and the phantom SCSI device, embedded controller 24, is not selected, so the routine jumps to the beginning of the loop step 152.

If, however, the SCSI initiator only asserted 1 bit of the SCSI data bus DB<7 . . . 0>* during the SELECTION phase, then the embedded controller 24 (the phantom SCSI device) has been selected. In response, the routine again determines if SEL* is true at step 158 and if BSY* is false at step 160. If either condition fails, the routine loops to its beginning, step 152. This is simply a repeat of steps 152 and 154, but it ensures that the readings of the SEL* and BSY* signals were in fact valid. This case would generally only be true when the phantom device is responding. The software based delays to perform the various steps to this point greatly exceed most conventional SCSI device response times, so that the only likely condition where the selection phase has remained this relatively long is if no other device will respond. Had other devices responded, the SEL* and BSY* signals would not check true this late in a cycle.

If SEL* is still true and BSY* is still false, at step 166, the embedded controller 24 asserts the BSY* signal true, or low. By doing this, the phantom SCSI device (the embedded controller 24) has acknowledged being selected and can communicate with the SCSI initiator as a normal target exchanging messages as would typically be done in SCSI communications.

Thus, at step 168, the SCSI controller 15 has selected the embedded controller 24 as the phantom target, and the routine then jumps to other code where normal SCSI communications are carried out. The SCSI controller 15 can then instruct the embedded controller 24 to turn on and off various indicator LEDs 26 or to return information about the various devices in the backplane connectors 16–22, or to execute other functions that the embedded controller 24 might be capable of executing or the SCSI controller in the host computer system 10 might desire.

Turning now to FIGS. 3A–3F, those figures show the backplane connectors 16–22 connected to the SCSI bus via a SCSI connector 200. The SCSI connector 200 is a 50 pin connector, but could be another type of SCSI connector. It connects to the SCSI cable 12 via the SCSI port 13.

The backplane connectors 16–22 are individually electronically keyed to indicate a specific SCSI ID. This eradicates the need for having to physically configure each drive that is plugged into the backplane connectors 16–22 in the SCSI box 14. For example, the backplane connector 18 is keyed as SCSI ID 2 by tying together pins 63 and 64 of the 70-pin connector. A drive configured to be plugged into the backplane connectors 16–22 can sense those particular lines tied together, thus informing it into which SCSI ID slot it has been inserted.

Also connected to the backplane connectors 16–22, are the signal lines ONLINE_LED<6 . . . 0>*, ACTIVITY_LED<6 . . . 0>*, SERVICE_LED<6 . . . 0>* and INSTALLED <7 . . . 0>*. One of each of these lines is connected to each of the backplane connectors 16–22. Using the first three of these signals, each drive placed into the backplane connectors 16–22 can have 3 LEDs for indicating whether that drive is online, active, or in need of service. INSTALLED<7 . . . 0>* is used to indicate the presence of a device in the backplane connectors 16–22; a present device pulls the corresponding line low. These signals are provided in part by the embedded controller 24 and in part by the associated driver circuitry 28, as will be described later.

Finally in FIGS. 3A–3F, note the SCSI data bus signals DB<0 . . . 7>*. These are the signals used to indicate, during the SELECTION phase, the SCSI ID of the initiator and the target. These lines are also used for bi-directional data communication between the embedded controller 24, and the SCSI controller 15.

Figure 4A:
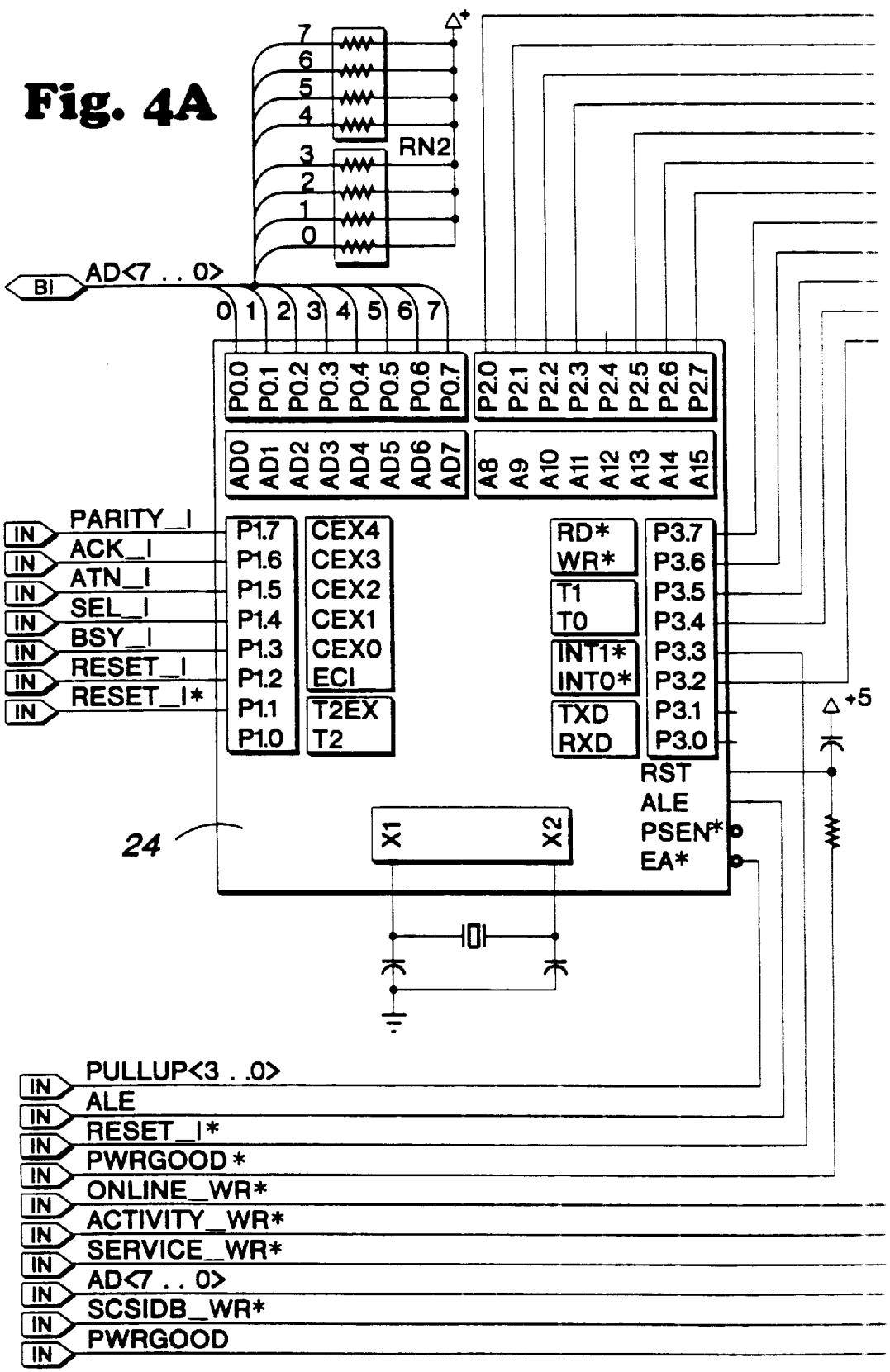
FIGS. 4A and 4B are a schematic showing an embedded controller for operation as a phantom SCSI device with no SCSI address in a SCSI box constructed according to the invention.
Figure 4B:
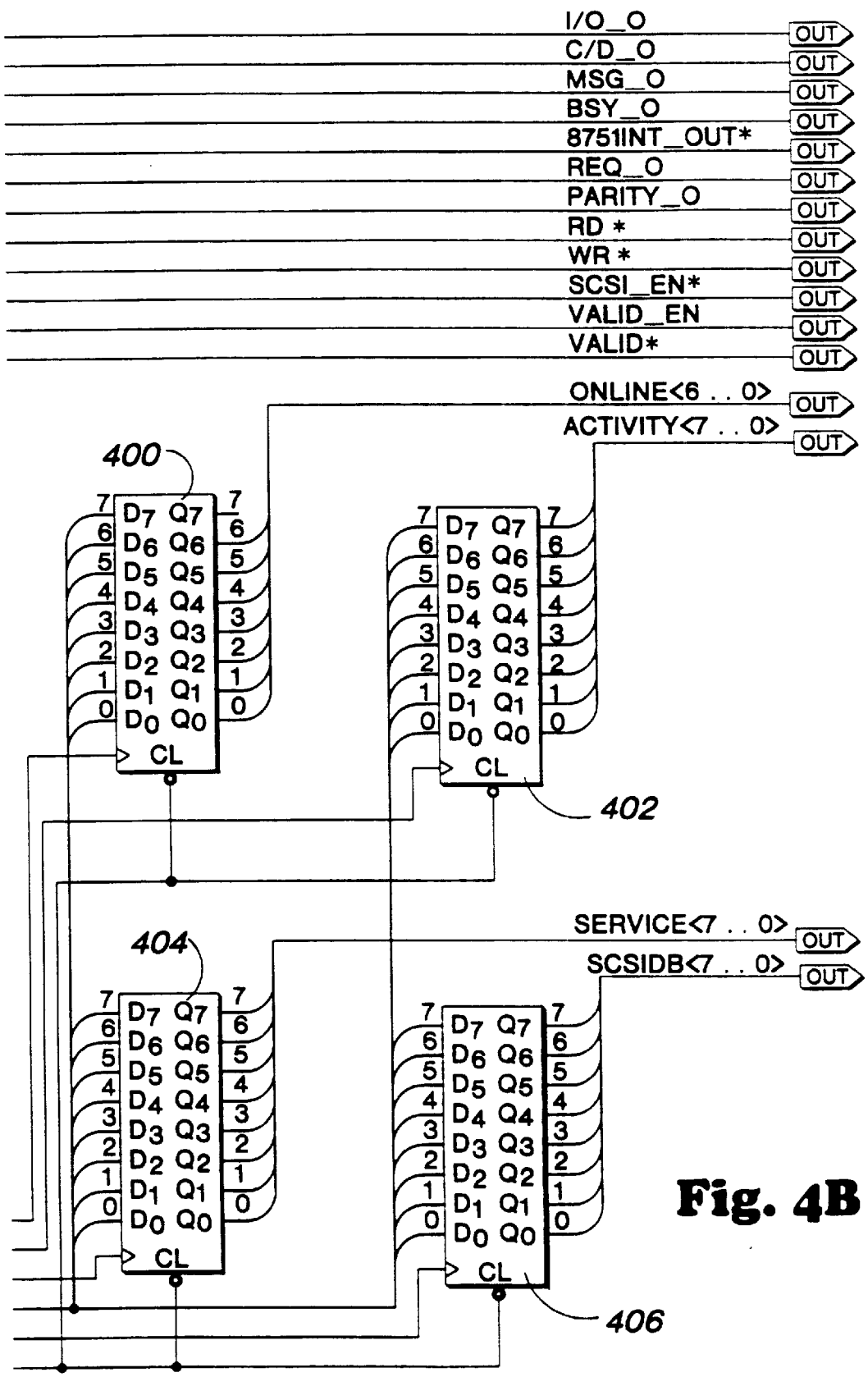

FIGS. 4A and 4B show a schematic of the embedded controller 24 as well as an ONLINE_LED flip-flop 400, an ACTIVITY_LED flip-flop 402, a SERVICE_LED flip-flop 404, and a SCSI data bus flip-flop 406. These flip-flops 400, 402, 404 and 406 are enabled by the signals ONLINE_WR*, ACTIVITY_WR*, SERVICE_WR*, and SCSIDB_WR* respectively, and when enabled, are loaded from the embedded controller 24 via the embedded controller's data bus AD<7 . . . 0>. The flip-flops 400, 402, 404 and 406 are typically 74LS273 octal D-type flip-flops, and they output the signals ONLINE<6 . . . 0>, ACTIVITY<7 . . . 0>, SERVICE<7 . . . 0>, and SCSIDB<7 . . . 0> respectively. The flip-flops 400, 402 and 404 provide storage for the LED signals ONLINE_LED<6 . . . 0>*, ACTIVITY LED<6 . . . 0>*, and SERVICE_LED<6 . . . 0>*, as shown in FIGS. 3A–3F, as well as two of the indicator LEDs 26 that are part of the SCSI box 14 that indicate activity of the phantom SCSI device and that indicate that the SCSI box 14 needs service.

Figure 5A:
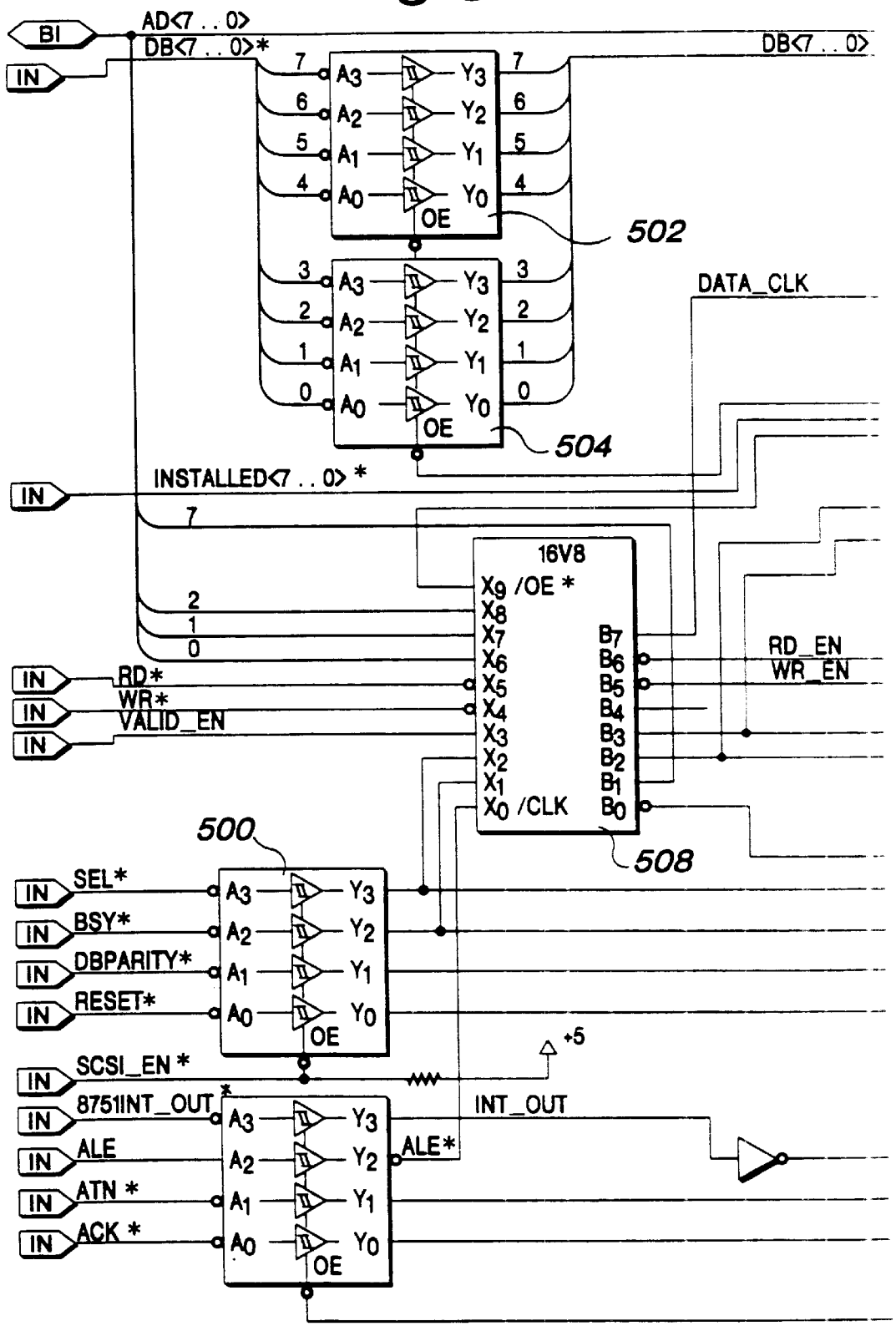
FIGS. 5A and 5B are a schematic partially showing the interface logic for the embedded controller of FIGS. 4A and 4B used as a phantom SCSI device according to the invention.
Figure 5B:
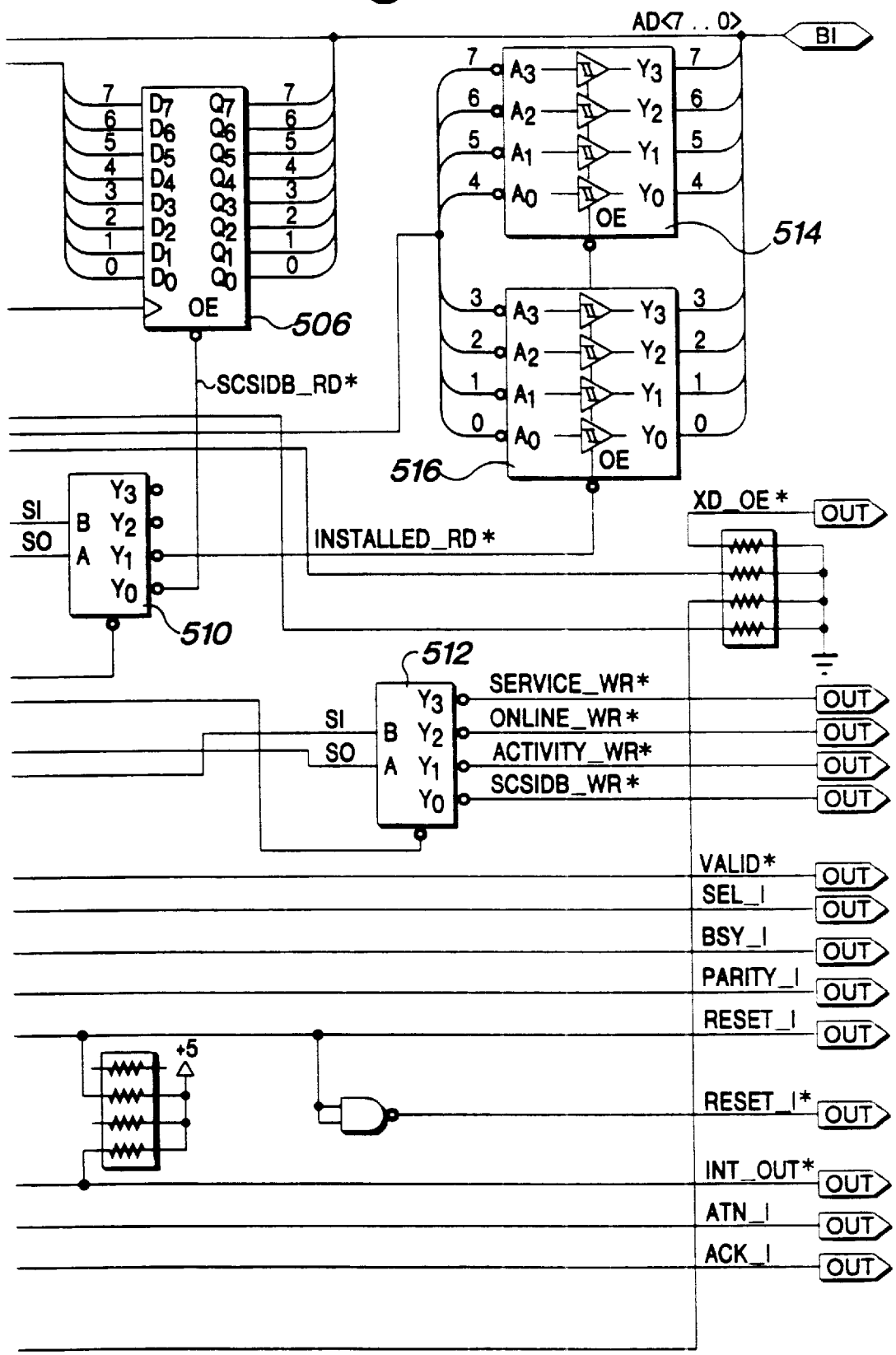

FIGS. 5A and 5B show some of the logic used to read and write from the SCSI bus, as well as drivers from the SCSI bus that provide signals to the embedded controller 24. An inverting buffer 500 provides the SEL* signal and BSY* signal to the embedded controller 24 via the signals SEL_I and BSY_I. Inverting buffers 502 and 504 also provide the values on the SCSI data bus DB<7 . . . 0>* to a flip-flop 506, which stores these values and is enabled and clocked onto the embedded controller's data bus AD<7 . . . 0> via signals from a PAL 508.

An output of the PAL 508 drives the CLK signal of the flip-flop 506, and three other outputs of the PAL 508 drive a decoder 510, which in turn drives the output enable of the flip-flop 506. A second decoder 512, driven by three outputs of the PAL 508, provides the write enable signals to the ONLINE_LED flip-flop 400, the ACTIVITY_LED flip-flop 402, and the SERVICE_LED flip-flop 404. The decoders 510 and 512 are typically a 74LS139 and the PAL 508 is typically a 16V8. The flip-flop 506 is typically a 74LS374, and the inverting buffers 500, 502, and 504 are typically 74LS240.

As inputs, the PAL 508 uses a read signal RD*, a write signal WR*, a valid enable signal VALID_EN, an address latch enable signal ALE*, and the embedded controller's data bus signals AD<7 . . . 0>. All of these signals are supplied by the embedded controller 24. The PAL 508 also uses the SEL_I signal and BSY_I signals as supplied by the driver 500. The outputs of the PAL 508 are always enabled. As outputs, the PAL 508 uses the following equations:

```
GOOD_ADDR        := AD7*;
GOOD_ADDR.clk    = ALE;
S1               := AD1;
S1.clk           = ALE;
S0               := AD0;
S0.clk           = ALE;
RD_EN            = GOOD_ADDR & RD & WR*;
WR_EN            = GOOD_ADDR & WR & RD*;
VALID            = VALID_EN & ((BSY* & SEL) #
                   (VALID   & BSY # SEL)));
DATA_CLK         = VALID # (S1* & S0* & RD &
                   WR*);
```

Also driven by the PAL 508 are two buffers 514 and 516. The signals INSTALLED<7 . . . 0>* are input to the buffers 514 and 516, which then drive those signals onto the embedded controller data bus AD<7 . . . 0> whenever the embedded controller 24 desires to determine which backplane connectors 16–22 have devices installed.

Thus, using the circuitry of FIGS. 5A and 5B, which is a substantial part of the driver circuitry 28, the embedded controller 24 can write data bytes to the output LED flip-flops 400, 402 and 404, and can also read the values of the SCSI data bus DB<7 . . . 0>* by using the flip-flop 506, as well as perform other functions. The flip-flop 506 thus traps each data value during a SCSI selection phase and on read operations from the embedded controller 24.

By writing to an address using an address less than 128 and having the least two bits properly set, the embedded controller 24 can provided data to the flip-flops 400, 402, 404 and 406. By reading from an address less than 128 and having the two lowest bits properly set, the embedded controller 24 can read the installed status and the SCSI DB<7 . . . 0>* signals. The embedded controller 24 can directly read the various SCSI control signals, such as ATN_I, SEL_I and BSY_I using an internal data port, as shown in FIGS. 4A and 4B.

Figure 6A:
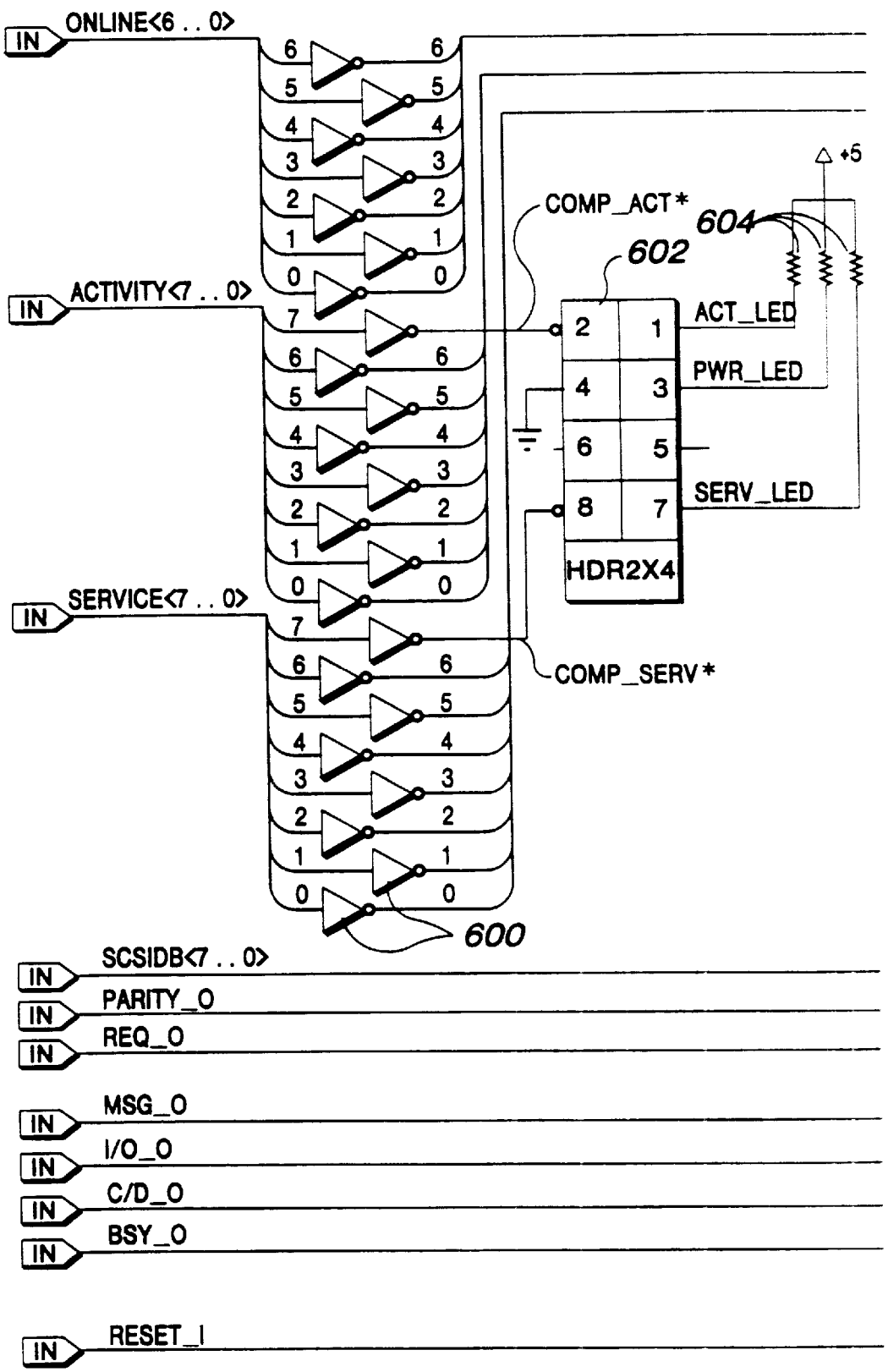
FIGS. 6A and 6B are a schematic showing light emitting diode (LED) output drivers for activation by the embedded controller shown in FIGS. 4A and 4B in a SCSI box built according to the invention.
Figure 6B:
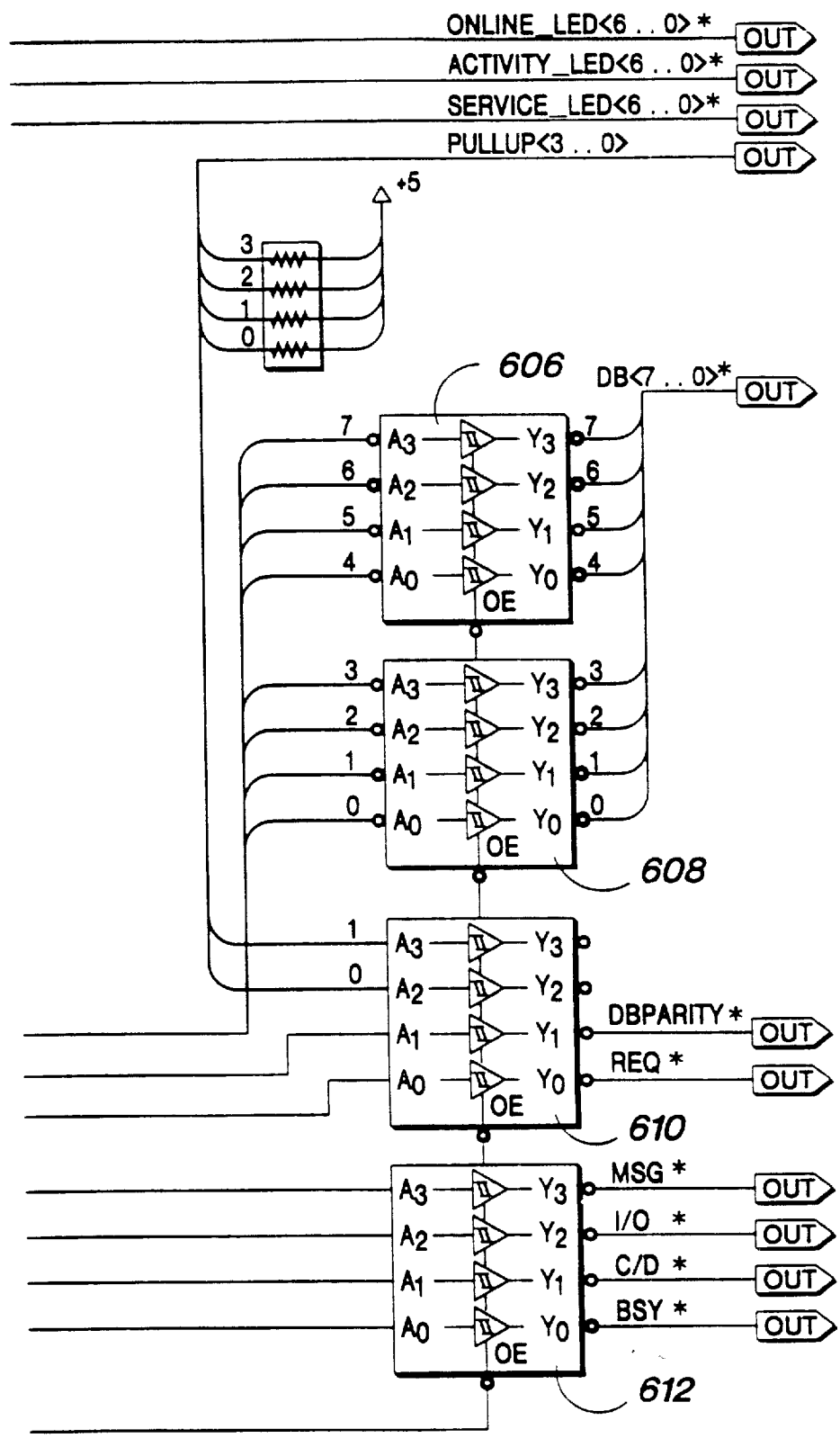

FIGS. 6A and 6B show the LED output drivers. The signals ONLINE<6 . . . 0>, ACTIVITY<7 . . . 0>, and SERVICE<7 . . . 0> are driven into inverting LED drivers 600. The outputs of these LED drivers 600 provide the signals ONLINE_LED<6 . . . 0>*, ACTIVITY_LED <6 . . . 0>* and SERVICE_LED<6 . . . 0>*, as well as the signals COMP_ACT* and COMP_SERV* to a connector 602. The values or states for these particular LEDs are provided from the host computer system 10 via the controller 15 to the addressed embedded controller 24 as part of a message or data transfer. The connector 602 connects to the indicator LEDs 26 on the SCSI box 14. When the signals COMP_ACT* and COMP_SERV* are low, they sink current through the indicator LEDs 26 on the SCSI box 14 via pull-up resistors 604 to 5 volts and are used to indicate activity and need for service of any of the installed devices to allow easy notice to the user of any problems or activities. The power indicator LED is on whenever 5 volts is on, as the connector 602 is correspondingly tied to ground on the other side of that LED.

The signals ONLINE_LED<6 . . . 0>, ACTIVITY_ LED<6 . . . 0> and SERVICE_LED<6 . . . 0> are provided to the backplane connectors 16–22 as shown in FIGS. 3A–3F. Thus, a drive inserted into these backplane 16–22 connectors can have the same types of LEDs as the indicator LEDs 26, and the embedded controller 24, on instruction from the host computer system 10 via the SCSI controller 15, can enable and disable any such LEDs depending on the status of the various devices.

FIGS. 6A and 6B also show output drivers 606, 608, 610, and 612. These are used to drive signals onto the SCSI bus using "wired-OR" outputs, as is specified by the SCSI standard. Of interest here is the BSY* signal, which the embedded controller 24 asserts to acknowledge selection, and the SCSI data bus DB<7 . . . 0>*, with which the embedded controller 24 communicates with the SCSI controller 15. These signals are provided by an internal output port of the embedded controller 24.

Because the embedded controller 24 can send information to the host computer system 10, the host computer system 10 can request information from the embedded controller 24 pertaining to the presence or absence drives in the backplane-connectors 16–22, with the embedded controller 24 reading the INSTALLED<7 . . . 0>* signal, and then the embedded controller 24 returning the answer.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of communicating on a SCSI bus between an initiator device and a separate target device, the separate target device not being assigned a SCSI address, comprising the steps of:

providing the initiator device and the separate target device on the SCSI bus as physically separate devices;
   the separate target device monitoring the signals on the SCSI bus for the start of a SELECTION phase;
   the separate target device determining during the SELECTION phase whether any single bit of the SCSI data bus is asserted to indicate the initiator device selecting itself as a target; and
   if any single bit of the SCSI data bus is asserted, the separate target device responding on the SCSI bus.

2. The method of claim 1, further comprising the step of:
after determining that any single bit of the SCSI data bus is asserted during a SELECTION phase and before responding as the target device, the separate target device verifying that the SELECTION phase is still occurring.

3. The method of claim 2, wherein said steps of monitoring for the start of a SELECTION phase and verifying that the SELECTION phase is still occurring each further comprise the steps of:
the separate target device monitoring for an indication that another device is responding, and
wherein if another device is responding, the separate target device monitoring for the start of a next SELECTION phase.

4. The method of claim 1, wherein said step of monitoring for the start of a SELECTION phase further comprises the steps of:
the separate target device monitoring for an indication that another device is responding, and
wherein if another device is responding, the separate target device monitoring for the start of a next SELECTION phase.

5. A target device for connection to a SCSI bus and having no assigned SCSI address, the target device being responsive to a physically separate initiator device for connection to the SCSI bus, the target device comprising:
interface circuitry that is capable of interfacing to a SCSI bus; and
means connected to said interface circuitry for monitoring the signals on the SCSI bus for the start of a SELECTION phase, for determining during the SELECTION phase whether the physically separate initiator device has asserted any single bit of the SCSI data bus to indicate the physically separate initiator device selecting itself as a target and if any single bit of the SCSI data bus is asserted, for responding on the SCSI bus as being the target.

6. The target device of claim 5, wherein after determining that any single bit of the SCSI data bus is asserted during a SELECTION phase and before responding as the target, said means verifies that the SELECTION phase is still occurring.

7. The device of claim 6, wherein said means further comprises:
means for monitoring for an indication that another device is responding after monitoring for the start of a SELECTION phase, and wherein if another device is responding, for monitoring for the start of a next SELECTION phase; and
means for monitoring for an indication that another device is responding after verifying that the SELECTION phase is still occurring, and wherein if another device is responding, for monitoring for the start of a next SELECTION phase.

8. The device of claim 5, wherein said means further comprises:
means for monitoring for an indication that another device is responding after monitoring for the start of a SELECTION phase, and wherein if another device is responding, for monitoring for the start of a next SELECTION phase.

9. The device of claim 5, wherein said means includes a microcontroller.

10. A target device for connection to a SCSI bus and having no assigned SCSI address, the target device being responsive to a physically separate initiator device for connection to the SCSI bus, the target device comprising:
interface circuitry that is capable of interfacing to a SCSI bus;
selection phase monitoring circuitry coupled to said interface circuitry and adapted to provide a selection signal indicating the start of a selection phase;
address monitoring circuitry coupled to said interface circuitry and adapted to provide an initiator self-address signal as true responsive to the selection signal and in response to any single bit of the SCSI data bus being asserted by the physically separate initiator device; and
response circuitry adapted to respond as a target on the SCSI bus in response to the initiator self-address signal being true.

11. The target device of claim 10, wherein the selection phase monitoring circuitry includes a microcontroller with memory, the memory containing computer code which when executed by the microcontroller performs the steps of:
monitoring for an indication that another device is responding after monitoring for the start of the Selection phase, and wherein if another device is responding, for monitoring the start of a next Selection phase; and
monitoring for an indication that another device is responding after verifying that the Selection phase is still occurring, and wherein if another device is responding, for monitoring the start of a next Selection phase.

* * * * *